UNITED STATES PATENT OFFICE.

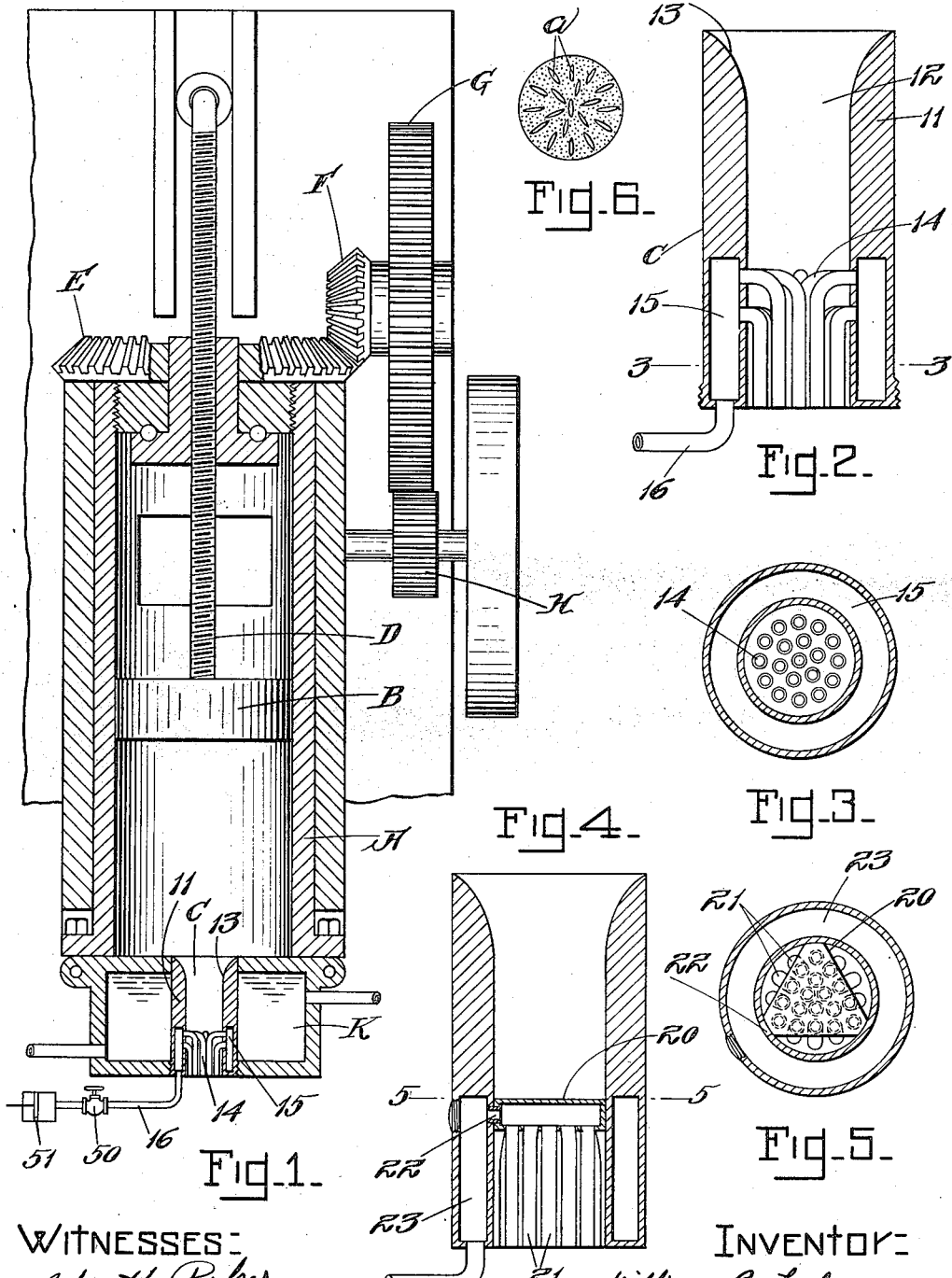

WILLIAM B. LASKEY, OF MARBLEHEAD, MASSACHUSETTS.

CANDY-MAKING MACHINE.

1,281,592.   Specification of Letters Patent.   Patented Oct. 15, 1918.

Application filed February 25, 1915.   Serial No. 10,608.

*To all whom it may concern:*

Be it known that I, WILLIAM B. LASKEY, a citizen of the United States, residing at Marblehead, county of Essex, State of Massachusetts, have invented a certain new and useful Improvement in Candy-Making Machines, of which the following is a specification, reference being had therein to the accompanying drawings.

My invention relates to a novel candy-making machine for producing throughout the body of a piece of candy a plurality of holes or passages. The machine embodying my invention is particularly applicable to the manufacture of stick candy but is also useful in the manufacture of chocolate coated goods and any other kinds of candy in which it is desirable to have holes formed. The machine embodying my invention may also be employed to introduce into the holes formed in the candy any desired kind of semi-liquid filling material, such for instance as peanut butter.

It is well known to those skilled in this art that it is frequently highly desirable to form holes or pores in the interior of a piece of candy so that as the candy is eaten, it may be easily crushed and the saliva will quickly penetrate the pores, which results in giving to the candy a sweeter taste than the same material would have if in a dense or non porous condition. Another advantage is that the candy has an increased bulk per unit of weight. The device herein is adapted to form a stick or pieces of candy and simultaneously therewith to form in the interior of the stick a series of longitudinal holes or passages which may be of any desired relative diameter and arranged as desired. These holes may be filled with liquid or semiliquid material as they are produced. The device shown herein is particularly adapted for use in connection with the machine shown and described in my application for U. S. Letters Patent filed April 5, 1912, Ser. No. 688,610, and for practising the process herein described.

The invention will be understood from the following description taken in connection with the accompanying drawings and the novel features thereof are pointed out and clearly defined in the claims at the end of this specification.

In the drawings,—

Figure 1 is a vertical section of the machine to which the device embodying my present invention is applied.

Fig. 2 is a vertical section of the device embodying my invention on a scale somewhat larger than that of Fig. 1.

Fig. 3 is a section on line 3—3 Fig. 2 looking down.

Fig. 4 is a vertical section of the device embodying my invention in modified form.

Fig. 5 is a section on line 5—5, Fig. 4.

Fig. 6 is a cross section of a stick of candy formed by the employment of the device shown in Figs. 2 and 3.

Referring now to the drawings,—there is shown at A a cylinder and at B a piston by means of which candy contained in the cylinder A is subjected to heavy pressure to force it through the nozzle C. The piston is operated by means of screw threaded piston rod D and the gears E, F, G, and H all in the manner described in my previous application hereinbefore referred to. In that application, the nozzle C is referred to as removable from the machine and as being surrounded by a water jacket K by means of which the temperature of the candy as it is passing through the nozzle or die C may be suddenly raised for the shortest possible period of time so as to permit the shaping of the candy by its passage through the nozzle. If it is desired to make candy which shall be porous, I supply the machine as shown in Fig. 1 and as described in my previous application, with a nozzle of the kind which will now be described. The nozzle consists in a tubular body 11 having therein a bore 12 with a flaring throat 13 to facilitate the entrance of the candy into the said bore. At the lower end of the nozzle 11, there are supported a series of hole-forming members 14, the ends of which are secured to the walls of the bore 12 of the nozzle 11. These hole-forming members 14 are small bent tubes open at their lower ends and secured to the walls of the bore of the nozzle. The hole-forming members may be arranged in any desired pattern in the nozzle and may be supported as described or in any other convenient manner. In the walls of the lower end of the nozzle there is formed a cylindrical chamber 15 with which the interior space of each of the tubular hole-forming members 14 communicates. At 16 is indicated a pipe connected with the air chamber 15. Air from the atmosphere enters the pipe 16 through the valve 50 when this valve is open and passes to the chamber 15 and thence into the hole-forming members.

The candy which has been properly pulled or otherwise prepared is placed in the cylinder A and is subjected to heavy pressure by the piston B to force it down through the bore 12 of the nozzle C. As the candy passes through the nozzle C. it is heated suddenly by the water jacket K surrounding the said nozzle so that it becomes momentarily plastic and will flow under the heavy pressure to which it is subjected. The candy as it is forced through the nozzle C is formed into a stick shape and each of the hole forming members 14 leaves a corresponding hole or passage through the resulting stick of candy. So long as the lower ends of these holes or passages $a$, formed in the candy see Fig. 6, remain open, the air is free to rush up into the said passages $a$, and therefore there is no tendency for the walls of the holes in the candy to be crushed or collapsed by exterior atmospheric pressure, as would be the case if the air were not free to enter the lower end of the holes as the stick emerges from the machine. Therefore, so long as the lower ends of the holes are kept open it is possible to use solid hole-forming members 14. However, I find that said holes are likely to be closed by severing the candy when it is in still plastic condition or by handling the candy, and that thereafter the walls of the holes are likely to collapse on account of the atmospheric pressure. To obviate this difficulty I prefer to make the hole-forming members tubular, as described, and to connect them with the air chamber 15, and to open said air chamber 15 to the outer air so that as the candy is forced down through the nozzle or die and the holes are formed therein air will flow in rapidly enough to fill the holes formed in the candy. The pressure of the atmosphere on the exterior of the candy will therefore be balanced by a corresponding pressure on the interior of the holes and the walls will not be collapsed by the atmospheric pressure. In practice, I find that the candy produced has formed therein holes which are elliptical in cross-section instead of circular.

After the candy has been forced through the dies it may then be drawn down or pulled out by hand to whatever smaller diameter is desired in the manner well known to stick candy makers. If this is done skilfully, the diameter of the stick candy will be reduced without destroying the porous character of the candy, or reducing the size of the holes made in the candy relatively to the cross sectional area of the stick, or destroying the pattern of the holes in the candy. If it is desired to make the holes in the candy larger, compressed air may be introduced through the pipe 16 which will cause the holes in the candy to expand as the candy leaves the nozzle, the amount of the expansion being regulated by regulating the pressure of the air introduced. As a means of introducing the compressed air, I have shown a pump 51. If it is desired to fill the holes formed in the candy with some fluid or semi-fluid material as for instance peanut butter, this may be done by means of the pump 51, which will be effective to force the filling material through the pipe 16 into the chamber 15 and thence through the hole-forming members 14 into the holes formed by them in the candy.

While I have shown the hole-forming members 15 as supported on the side walls of the nozzle it is possible to support them in other ways, as for instance by means of a triangular plate 20, see Figs. 4 and 5, which is itself secured to the interior of the nozzle C and to the under side of which are secured the hole-forming members 21, these members being bent and of such a shape that the lower ends of the members are distributed evenly or in the desired pattern over the lower orifice of the nozzle C. The triangular plate 20 is hollow, as shown in Fig. 5, and communicates through the port 22 with the air chamber 23 formed in the side walls of the nozzle C. The hole forming-members 14 may be arranged to form any desired pattern and that pattern will be substantially reproduced by the holes formed in the candy. It will also be understood that the hole-forming members are not of necessity circular in cross-section, and that a different shape will produce correspondingly different holes in the candy.

What I claim is:

1. In a machine for forming candy, the combination of a nozzle, mechanism for forcing plastic candy through the nozzle, a plurality of tubular non-concentric hole-forming members supported within the nozzle each of which is parallel with the axis of the said nozzle for substantially its entire length, and means connecting the interior of each of the hole forming members with the atmosphere.

2. In a machine for forming candy, the combination of a nozzle, mechanism for forcing plastic candy through the nozzle, an air chamber communicating with the atmosphere, and a plurality of tubular non-concentric hole-forming members supported within the nozzle and each communicating at its inner end with the atmosphere, said members being parallel with the axis of the nozzle for substantially their entire length.

3. In a machine for forming candy, the combination of a nozzle the walls of which are parallel with each other, mechanism for forcing plastic candy through the nozzle, a plurality of tubular non-concentric hole-forming members supported within the nozzle each of which is parallel with the walls of the nozzle for substantially its entire length, and means for connecting the interior of each of the hole forming members with the atmosphere.

4. In a machine of the character described, the tubular nozzle having formed in the walls thereof an air chamber, a plurality of tubular hole-forming members supported on the walls of the bore of the said nozzle and connected with the said air chamber and means connecting said air chamber with the atmosphere.

5. In a machine for forming candy, the combination of a nozzle having a chamber therein, a plurality of tubular parallel non-concentric hole-forming members secured within the bore of said nozzle, means for forcing candy through the said nozzle, and a pump connected with said chamber for forcing a fluid through said chamber into and out of said hole forming members.

In testimony whereof I affix my signature, in presence of two witnesses.

WILLIAM B. LASKEY.

Witnesses:
GEORGE P. DIKE,
ALICE H. MORRISON.